United States Patent
Miescher et al.

(10) Patent No.: US 8,235,638 B2
(45) Date of Patent: Aug. 7, 2012

(54) AUXILIARY CONSTRUCTIONAL COMPONENT

(75) Inventors: Stefan Miescher, Schaan (LI); Harald Fielitz, Buchs (CH); Walter Odoni, Planken (LI); Ulrich Schiestl, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 443 days.

(21) Appl. No.: 12/459,417

(22) Filed: Jun. 30, 2009

(65) Prior Publication Data
US 2010/0003107 A1    Jan. 7, 2010

(30) Foreign Application Priority Data
Jul. 3, 2008 (DE) .......................... 10 2008 040 121

(51) Int. Cl.
*F16B 15/00* (2006.01)

(52) U.S. Cl. .................................................... 411/441

(58) Field of Classification Search ............. 411/440, 411/441; 227/8, 119, 107
See application file for complete search history.

(56) References Cited

U.S. PATENT DOCUMENTS

| | | | | |
|---|---|---|---|---|
| 2,499,227 | A * | 2/1950 | Miles | 227/8 |
| 2,954,717 | A * | 10/1960 | Henning et al. | 411/440 |
| 2,961,210 | A | 11/1960 | Pfaff | |
| 3,768,412 | A * | 10/1973 | Dardick | 102/436 |
| 3,913,876 | A | 10/1975 | Miscerry | |
| 4,091,981 | A * | 5/1978 | Moriguchi et al. | 227/8 |
| 4,227,637 | A * | 10/1980 | Haytayan | 227/8 |
| 4,403,722 | A * | 9/1983 | Nikolich | 227/8 |
| 4,505,018 | A * | 3/1985 | Regalbuto et al. | 29/432 |
| 4,534,500 | A * | 8/1985 | Jochum | 227/7 |
| 4,655,423 | A | 4/1987 | Schavilje | |
| 7,861,905 | B2 * | 1/2011 | Miescher et al. | 227/7 |

FOREIGN PATENT DOCUMENTS

EP 0 588 467 A2 * 7/1988

* cited by examiner

*Primary Examiner* — Flemming Saether
(74) *Attorney, Agent, or Firm* — Abelman, Frayne & Schwab

(57) ABSTRACT

A auxiliary constructional component includes a base member (11), a guide section (12) for a fastening element (30) and projecting from the base member (11), and a feeler element (20) displaceably supported on the base member (11) for displacement along an attachment axis (A) defined by a through-opening (13) formed in the guide section (12), having at least one, radially spaced from the through-opening (13), placement surface (21) for a press-on feeler (42) of a setting tool, and projecting in an initial position of the feeler element (20) beyond a side of the base member (11) remote from the guide section (12).

5 Claims, 4 Drawing Sheets

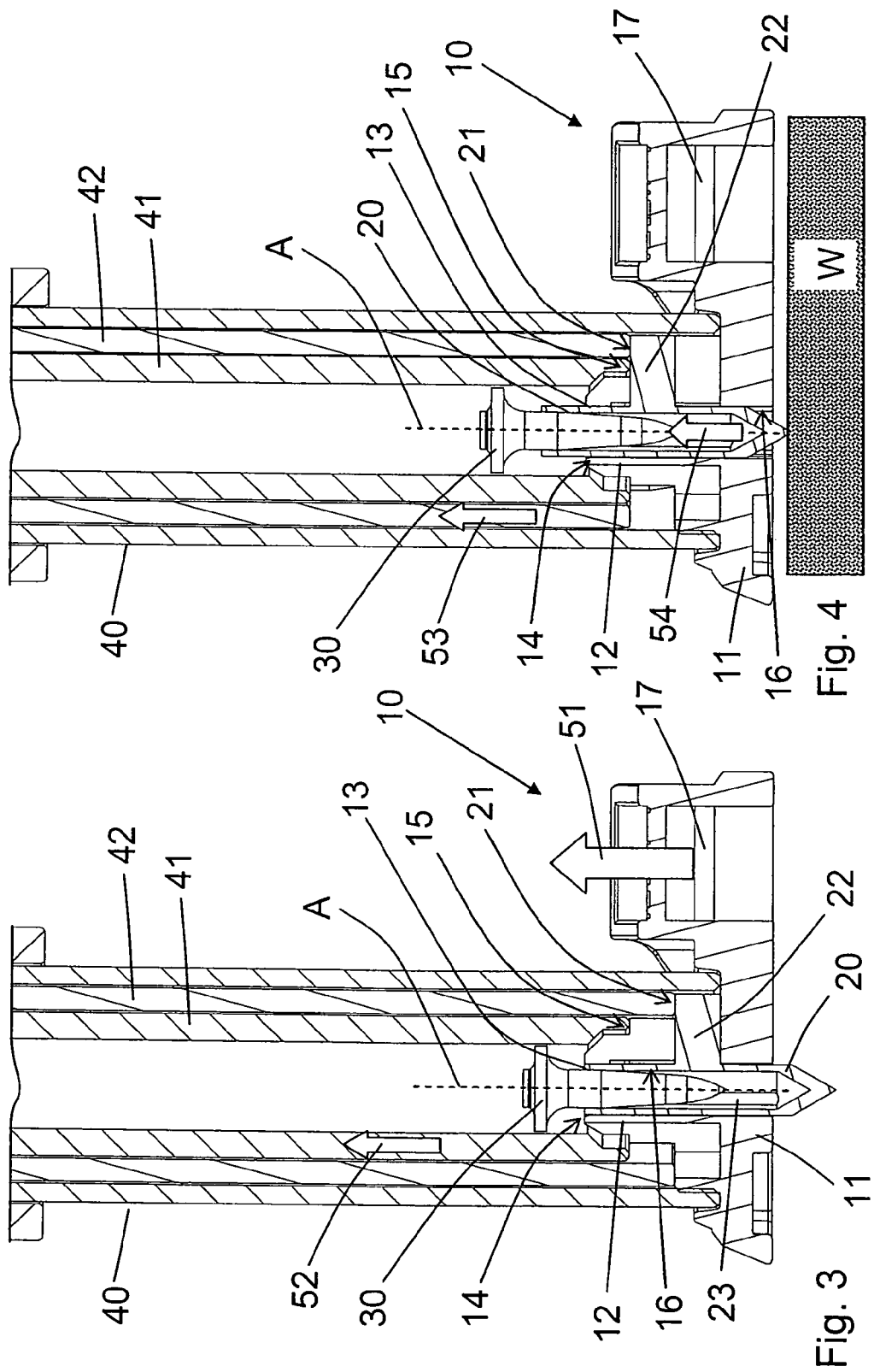

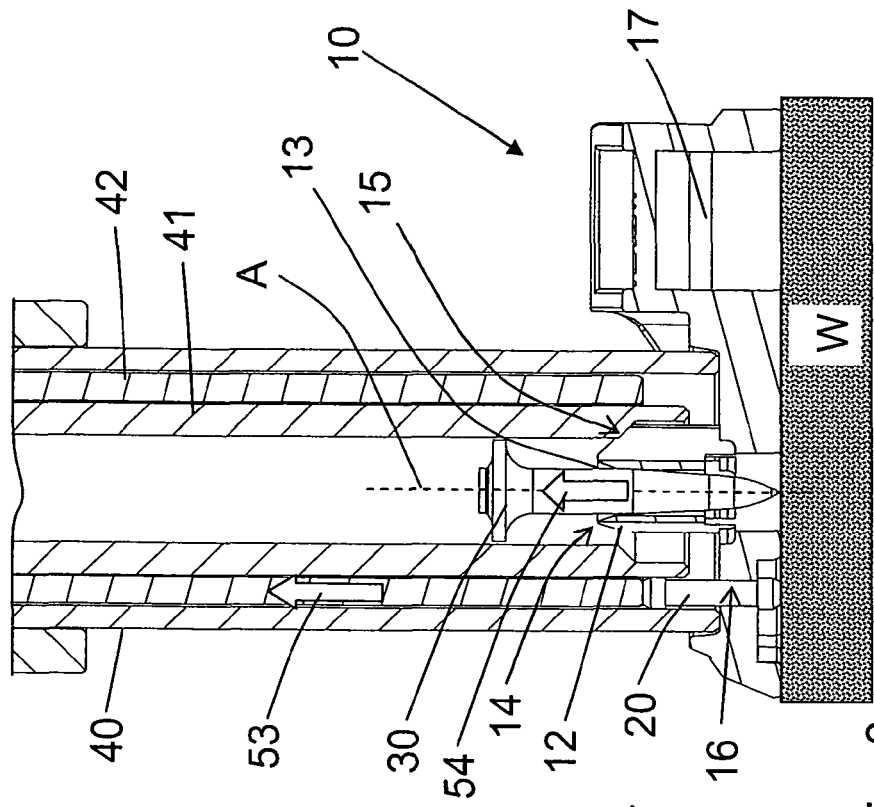
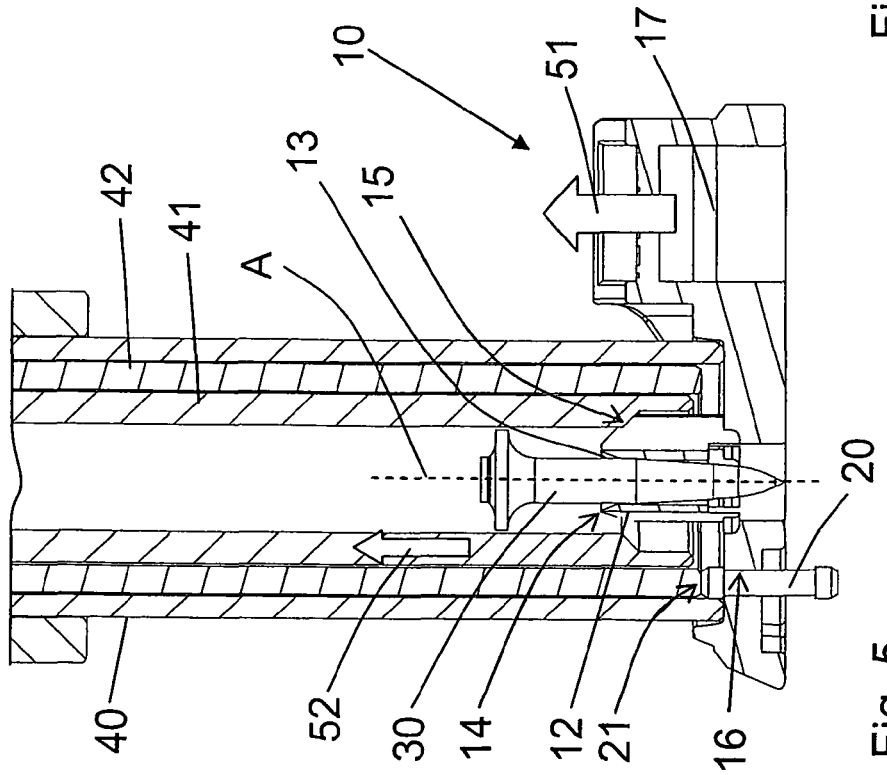

AUXILIARY CONSTRUCTIONAL COMPONENT

BACKGROUND OF THE INVENTION

1. Field of the Invention

The present invention relates to a auxiliary constructional component for mounting on a setting tool and having a base member and a guide section for a fastening element and projecting from the base member and having a through-opening through which the fastening element is extendable, and an abutment for the fastening element.

2. Description of the Prior Art

Auxiliary constructional components of the type described above are formed, e.g., as formwork stops, cable connectors, pipe clips, pipe clamps, or angles and are secured to a constructional component or a workpiece with fastening elements such as nails, pins, etc. driven in by a setting tool. The auxiliary constructional components have, among others, a holding section with which they pinned on a muzzle of a setting tool.

U.S. Pat. No. 2,961,210 discloses a auxiliary constructional component which is formed as a pipe clip and has a sleeve-shaped guide section with an abutment for a fastening element formed as a nail. The sleeve-shaped guide section projects beyond the base of the auxiliary constructional component and is arranged adjacent to a bent holding bracket for the pipe. The sleeve-shaped guide section can be inserted in an opening of a muzzle of a setting tool before a setting process.

The drawback of the known auxiliary constructional component consists in that after pinning-on of a such auxiliary constructional component on a muzzle of a setting tool, a press-on mechanism for actuating the setting tool is easily simulated by manually pressing the auxiliary constructional component against the tool housing, which results in easy manipulation of the setting tool.

European Patent EP 0 855 467 B1 discloses a auxiliary constructional component formed as a grid holder having a base for being supported on a constructional component or a workpiece. A guide section, which is formed as a truncated cone and has an abutment for a fastening element such as nail, projects from the base. Sidewise of the base, a grid holding section is arranged.

Here, likewise, the drawback of the disclosed element consists in that after pinning-on of the auxiliary constructional component on the muzzle of the setting tool, a press-on mechanism for actuating the setting tool is easily simulated by manually pressing the auxiliary constructional component against the tool housing, which results in easy manipulation of the setting tool.

Accordingly, an object of the present invention is to provide a auxiliary constructional component of the type discussed above and which would enable to detect an engagement of the auxiliary constructional component with a constructional component or a workpiece.

SUMMARY OF THE INVENTION

This and other objects of the present invention, which will become apparent hereinafter, are achieved by providing in the auxiliary constructional component of the type discussed above a feeler element displaceably supported on the base member for displacement along the attachment axis, having at least one, radially spaced from the through-opening of the guide section, placement surface for the press-on feeler of the setting tool, and projecting, in an initial position of the feeler element, beyond a side of the base member remote from the guide section.

The feeler element, which is displaceably supported on the base member, permits to transmit detection of positioning of the base member on a constructional component or a workpiece to a press-on feeler of the setting tool.

Advantageously, the auxiliary constructional component is provided with a guide radially spaced from the guide section and the feeler element is formed as an elongate pin located in the guide, with the placement surface being provided on a pin end. Such a auxiliary constructional component is only slightly more expensive, and its manufacture requires only very small additional costs.

It is advantageous, when the feeler element is arranged in the guide without a possibility of being lost. To this end, the feeler element can be thickened at both ends, having their a cross-section greater than the inner cross-section of the guide.

Also, advantageously, the feeler element is formed as an elongate hallow pin having a receiving space for the fastening element, and the guide for the feeler element is arranged coaxially with the attachment axis. In this case, the guide coincides with the through-opening for the fastening element, and there is no need to provide a separate guide on the base member. This also enables a uniform and axially symmetrical transmission of the press-on force.

It is advantageous when the feeler element has at least one, sidewise extending projection on which the placement surface is provided. In this case, even with arrangement of the feeler element coaxially with the attachment axis, the displacement surface remains radially offset relative to the attachment axis or through-opening and is capable to actuate the press-on feeler of the setting tool.

Advantageously, the feeler element is provided with a plurality of sidewise extending, uniformly spaced from each other projections. This insures a reliable displacement of a press-on feeler of a setting tool even when the auxiliary constructional component is pinned on with a slight inclination on the muzzle of a setting tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a cross-sectional view illustrating mounting of the auxiliary constructional component shown in FIG. 1 at the mouth of a setting tool;

FIG. 4 a cross-sectional view of the assembly shown in FIG. 3 in a position in which the auxiliary constructional component is placed on a workpiece;

FIG. 5 a cross-sectional view illustrating mounting at a mouth of a setting tool of another embodiment of a auxiliary constructional component according to the present invention; and FIG. 6 a cross-sectional view of the assembly shown in FIG. 5 in a position in which the auxiliary constructional component is placed on a workpiece.

DETAILED DESCRIPTION OF THE PREFERRED EMBODIMENTS

Figure 1:
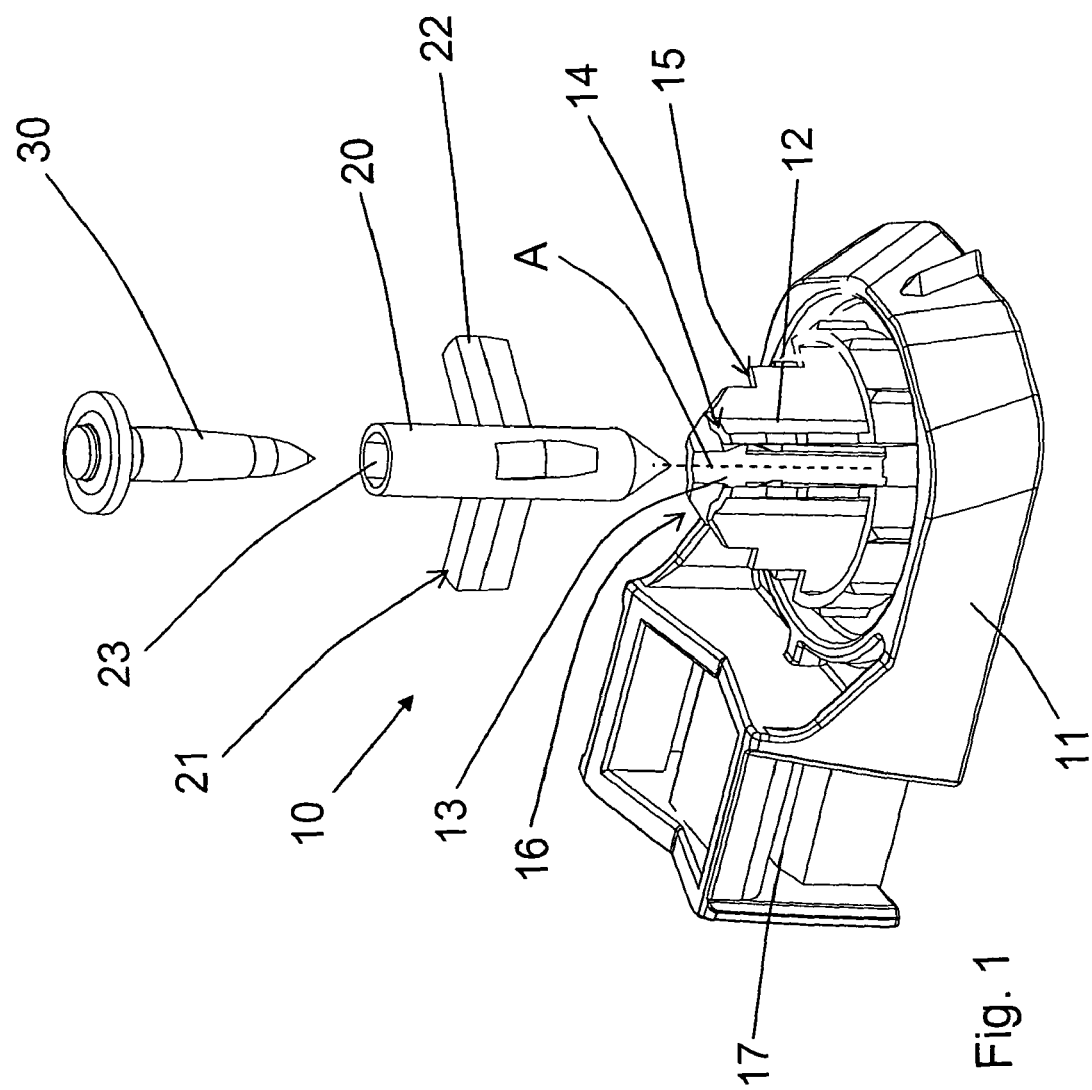
FIG. 1 a perspective view of a auxiliary constructional component according to the present invention and formed as a cable binder.
Figure 2:
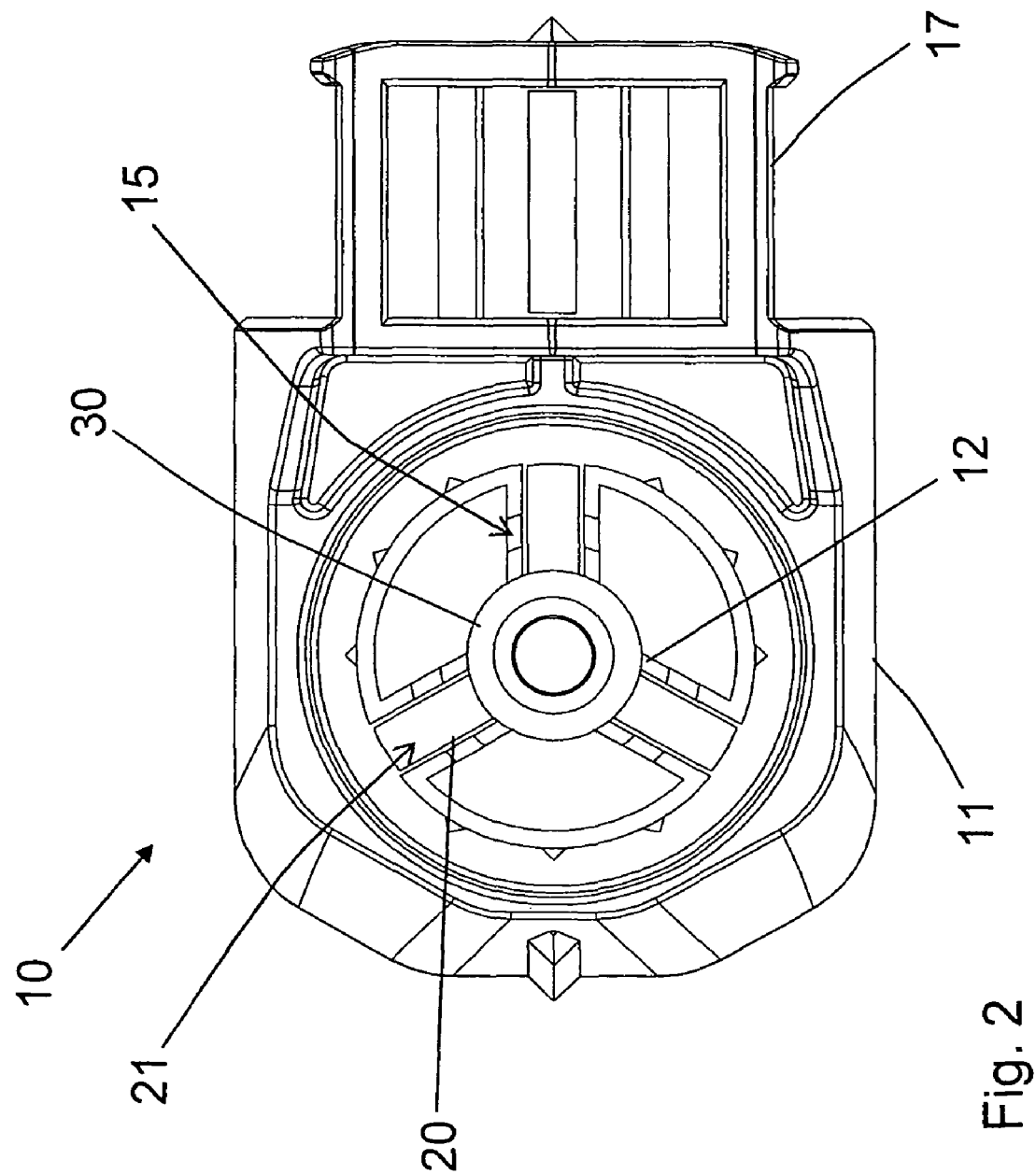
FIG. 2 a plan view of the auxiliary constructional component shown in FIG. 1.

An auxiliary constructional component 10 according to the present invention, which is formed as a cable connector or a cable header and which is shown in FIGS. 1 through 4, has a base member 11 and a tape guide 17 for a tape, not shown, with which a cable is secured. The tape guide 17 is arranged sidewise of the base member 11. A sleeve-shaped guide section 12 projects from the base member 11. The guide section 12 has a through-opening 13 for a fastening element 30 and which is surrounded by an abutment 14. The guide section 12 is provided with a placement profile 15 that displaces, as shown in FIGS. 3-4, a first press-on feeler 41 provided in the muzzle 40 of a setting tool in direction of a second arrow 52 when the auxiliary constructional component 10 is being pinned on the muzzle 40 in direction of first arrow 51 (see FIG. 3). With actuation of the first press-on feeler 41, the control electronics of the setting tool shifts into a stand-by position.

In the guide section 12, there is arranged a guide 16 for a feeler element 20 formed as an elongate hollow pin. The feeler element 20 has an axially extending receiving space 23 in which the fastening element 30 is inserted and is frictionally retained therein. The feeler element 20 has three, uniformly space from each other projections 22 projecting radially from the central pin element. On the projections 22, there are provided, on their sides facing in the pin-on direction, placement surfaces 21 for displacing a second press-on feeler 42 arranged in the muzzle 40 as shown in FIG. 4. When the setting tool is pressed with the auxiliary constructional component 10 pinned on the muzzle 40 against a workpiece W, the feeler element 20 is displaced from its initial position shown in FIG. 3 toward the muzzle 40 in the direction of the third arrow 53. The placement surfaces 21 on the projections 22 displace the second press-on feeler 42 in direction of fourth arrow 54 in the muzzle 40, as shown in FIG. 4. Upon actuation of the second press-on feeler 42, the control electronics of the setting tool is shifted to its setting-ready position, so that only an actuation switch or a trigger switch must be actuated to initiate a setting process.

The auxiliary constructional component 10, which is shown in FIGS. 5-6, differs from the auxiliary constructional component shown in FIGS. 1-4 in that the placement surface 21 is provided at an end of a pin-shaped feeler element 20 facing in the pin-on direction of mounting of the cable connector 10 on the muzzle 40 of the setting tool. In addition, the guide 16 for the feeler element 20 is radially spaced from the guide section 12. The guide 16 extends parallel to the attachment axis A but not coaxially therewith.

When the auxiliary constructional component 10 is pinned on the muzzle 40 of the setting tool in the direction of the first arrow 51, then the first press-on feeler 41 in the muzzle 40 is displaced by the placement profile 15 on the guide section 12 in the direction of the second arrow 52. As discussed above, upon actuation of the first press-on feeler, the control electronics of the setting tool shifts into a pre-setting ready position.

When the setting tool is pressed, with the auxiliary constructional component 10 pinned on its muzzle 40, against a workpiece W, as shown in FIG. 6, then the feeler element 20 is displaced from its initial position shown in FIG. 5 in direction of third arrow 53 toward the muzzle 40. The placement surfaces 21 on the projections 22 displace the second press-on feeler 42 in the direction of the fourth arrow 54 into the muzzle 40. As discussed above upon actuation of the second press-on feeler 42, the control electronics of the setting tool shifts into a setting ready position, so that for actuation of a setting process, only the actuation switch or the trigger switch of the setting tool must be actuated.

It should be understood that the auxiliary constructional component 10 can also be formed as formwork stop, spacer, reinforcement holder, tube collar, holding element, angle, ceiling suspension, or the like.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An auxiliary constructional component for mounting on a free end of a muzzle (40) of a setting tool having a press-on feeler (42), the auxiliary constructional component comprising a base member (11) securable on the free end of the muzzle (40); a guide section (12) for a fastening element (30) projecting from the base member (11) and having a through-opening (13) defining an attachment axis (A) and through which the fastening element is extendable, and an abutment (14) for the fastening element (30); and a feeler element (20) displaceably supported on the base member (11) for displacement along the attachment axis (A), and projecting in an initial position of the feeler element (20) beyond a side of the base member (11) remote from the guide section (12), and having at least one, radially spaced from the through-opening (13) of the guide section (12), placement surface (21) for supporting the press-on feeler (42) of the setting tool and for displacing the press-on feeler (42) from initial position of the press-on feeler (42) into a setting-ready position of the press-on feeler (42) upon being displaced from the initial position thereof to a position in which the base member (11) contacts the a workpiece.

2. An auxiliary constructional component according to claim 1, wherein the feeler element (20) has at least one, sidewise extending projection (22) on which the placement surface (21) is provided.

3. An auxiliary constructional component according to claim 2, wherein the feeler element (20) has a plurality of sidewise extending, uniformly spaced from each other, projections (22).

4. An auxiliary constructional component according to claim 2, wherein the sidewise extending projection is formed integrally with the feeler element (20).

5. An auxiliary constructional component for mounting on a setting tool having a press-on feeler (42), the auxiliary constructional component comprising a base member (11); a guide section (12) for a fastening element (30) projecting from the base member (11) and having a through-opening (13) defining an attachment axis (A) and through which the fastening element is extendable, and an abutment (14) for the fastening element (30); and a feeler element (20) displaceably supported on the base member (11) for displacement along the attachment axis (A), having at least one, radially spaced from the through-opening (13) of the guide section (12), placement surface (21) for the press-on feeler (42) of the setting tool, and projecting in an initial position of the feeler element (20) beyond a side of the base member (11) remote from the guide section (12), wherein the feeler element (20) is formed as an elongate hollow pin having a receiving space (23) for the fastening element (30), and wherein the auxiliary constructional component further comprises a guide (16) for the feeler element (20) arranged coaxially with the attachment axis (A).

\* \* \* \* \*